(12) United States Patent
Wang et al.

(10) Patent No.: US 10,178,430 B2
(45) Date of Patent: Jan. 8, 2019

(54) INTELLIGENT PROCESSING METHOD AND SYSTEM FOR VIDEO DATA

(71) Applicant: Hangzhou Hikvision Digital Technology Co., Ltd., Hangzhou, Zhejiang (CN)

(72) Inventors: Wei Wang, Zhejiang (CN); Qiqian Lin, Zhejiang (CN); Weichun Wang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 15/537,462

(22) PCT Filed: Dec. 9, 2015

(86) PCT No.: PCT/CN2015/096817
§ 371 (c)(1),
(2) Date: Jun. 19, 2017

(87) PCT Pub. No.: WO2016/119528
PCT Pub. Date: Aug. 4, 2016

(65) Prior Publication Data
US 2018/0007429 A1    Jan. 4, 2018

(30) Foreign Application Priority Data

Jan. 26, 2015    (CN) .......................... 2015 1 0037009

(51) Int. Cl.
*H04N 7/173*    (2011.01)
*H04N 21/44*    (2011.01)
(Continued)

(52) U.S. Cl.
CPC ... *H04N 21/44008* (2013.01); *G06K 9/00771* (2013.01); *H04N 5/225* (2013.01);
(Continued)

(58) Field of Classification Search
CPC ........ H04N 7/181; H04N 5/247; H04N 7/183; H04N 21/44008; H04N 7/185; H04N 17/002; H04N 21/23418; H04N 21/278
See application file for complete search history.

(56) References Cited

U.S. PATENT DOCUMENTS

| 5,969,755 A | 10/1999 | Courtney |
| 2003/0025599 A1* | 2/2003 | Monroe ........... G08B 13/19602 340/531 |

(Continued)

FOREIGN PATENT DOCUMENTS

| CN | 101448145 | 6/2009 |
| CN | 101854516 A | 10/2010 |

(Continued)

OTHER PUBLICATIONS

International Search Report dated Mar. 8, 2016, from International Application No. PCT/CN2015/096817, 2 pages.

(Continued)

*Primary Examiner* — Jason P Salce
(74) *Attorney, Agent, or Firm* — Meunier Carlin & Curfman LLC (57) ABSTRACT

The present application discloses an intelligent processing method and system for video data, wherein, in the method an intelligent camera set a warning rule, the method comprises: the intelligent camera collecting video data and analyzing the collected video data in real time, generating intelligent data if the warning rule is met, which intelligent data contain an encoder identifier and motion trajectory information; the intelligent camera packaging the video data and the intelligent data into a program stream and sending it to a frame analyzing component in a cloud storage system; the frame analyzing component unpacking the received program stream to obtain the video data and the intelligent data, and storing the video data and the intelligent data in storage (Continued)

components respectively; the storage components sending storage address information of the video data and the intelligent data to an index server for recording respectively. The solutions of the present application can perform intelligent processing for the collected video data in real time.

12 Claims, 6 Drawing Sheets (51) Int. Cl.
| | |
|---|---|
| *H04N 5/225* | (2006.01) |
| *H04N 5/232* | (2006.01) |
| *H04N 21/4408* | (2011.01) |
| *G06K 9/00* | (2006.01) |
| *H04N 5/77* | (2006.01) |
| *H04N 5/92* | (2006.01) |
| *H04N 7/18* | (2006.01) |
| *H04N 21/2187* | (2011.01) |
| *H04N 21/234* | (2011.01) |
| *H04N 21/235* | (2011.01) |
| *H04N 21/236* | (2011.01) |
| *G06T 7/292* | (2017.01) |
| *G08B 13/196* | (2006.01) |
| *G08B 21/24* | (2006.01) |

(52) U.S. Cl.
CPC .......... *H04N 5/23251* (2013.01); *H04N 5/77* (2013.01); *H04N 5/9201* (2013.01); *H04N 7/181* (2013.01); *H04N 7/183* (2013.01); *H04N 21/2187* (2013.01); *H04N 21/235* (2013.01); *H04N 21/23418* (2013.01); *H04N 21/23614* (2013.01); *H04N 21/4408* (2013.01); *G06T 7/292* (2017.01); *G08B 13/19608* (2013.01); *G08B 21/24* (2013.01)

(56) References Cited

U.S. PATENT DOCUMENTS

| | | | |
|---|---|---|---|
| 2005/0104958 A1* | 5/2005 | Egnal | G01S 3/7864 |
| | | | 348/143 |
| 2006/0078047 A1 | 4/2006 | Shu et al. | |
| 2007/0035627 A1* | 2/2007 | Cleary | G08B 13/19608 |
| | | | 348/159 |
| 2009/0256910 A1* | 10/2009 | Ganeshan | G08G 1/04 |
| | | | 348/148 |
| 2010/0321183 A1 | 12/2010 | Donovan et al. | |
| 2011/0181729 A1* | 7/2011 | Lee | H04N 5/232 |
| | | | 348/159 |
| 2011/0211036 A1* | 9/2011 | Tran | H04N 5/23238 |
| | | | 348/14.08 |
| 2012/0062732 A1 | 3/2012 | Marman et al. | |
| 2012/0176496 A1* | 7/2012 | Carbonell | H04N 7/188 |
| | | | 348/143 |
| 2013/0155229 A1 | 6/2013 | Thornton et al. | |
| 2013/0166711 A1* | 6/2013 | Wang | H04N 7/181 |
| | | | 709/223 |
| 2014/0232863 A1* | 8/2014 | Paliga | H04N 21/23109 |
| | | | 348/143 |
| 2018/0007429 A1* | 1/2018 | Wang | H04N 21/44008 |

FOREIGN PATENT DOCUMENTS

| | | |
|---|---|---|
| CN | 102194320 | 9/2011 |
| CN | 202634594 | 12/2012 |
| CN | 102857741 A | 1/2013 |
| CN | 103379266 | 10/2013 |
| CN | 104301680 A | 1/2015 |
| JP | 2007221581 | 8/2007 |

OTHER PUBLICATIONS

Machine Translation of Written Opinion dated Mar. 8, 2016, from International Application No. PCT/CN2015/096817, 5 pages.

* cited by examiner

INTELLIGENT PROCESSING METHOD AND SYSTEM FOR VIDEO DATA

The present application claims the priority to a Chinese Patent Application No. 201510037009.4, filed with State Intellectual Property Office of People's Republic of China on Jan. 26, 2015 and entitled "Intelligent Processing Method and System for Video Data", which is incorporated herein by reference in its entirety.

TECHNICAL FIELD

The present application relates to video processing technology, and in particular to an intelligent processing method and system for video data.

BACKGROUND

In existing intelligent processing solutions for video data, various IP cameras (IPCs) collect video data and send a video stream to a network storage server to store the same.

Then, users can read the video data from the storage server for playing. During the playing, feature requirements may be set to extract, in combination with intelligent information, video data satisfying the requirements for playing, thereby improving video search efficiency and realizing intelligent processing. The feature requirements are feature information of moving objects in an image, such as all the video data of images in which there are moving vehicles.

The existing intelligent processing solutions for video data are achieved specifically by means of:

configuring an individual video analyzing server, which sets a feature rule, such as data of moving vehicles present in all of the video images. After each IPC stores video streams in a storage server, the video analyzing server reads video data from the storage server periodically for analysis, and generates intelligent information and stores the same when the feature rule is satisfied; parameters of the feature rule satisfied by respective video data are recorded in the intelligent information. Next, when playing the video data in combination with the feature rule, it is possible to determine the video data satisfying the requirements according to the intelligent information, so as to play the video.

In the existing solutions, a post-analyzing method is used, wherein the periodical analysis of intelligent data is performed after the IPC stores video streams in a storage server, thereby only history stream can be processed. Due to the fact that IPC stores data periodically and not in real time, the video data which have been collected currently by an IPC but have not been stored in the storage server cannot be analyzed. Moreover, an individual video analyzing server completes the analysis for all the IPC video streams, which imposes a large amount of work and is time-consuming, and thus increasing technical difficulties for the video analyzing server. Therefore, the existing solutions of storing video data and intelligent data have a defect of poor time effectiveness.

SUMMARY

The present application provides an intelligent processing method for video data, which can intelligently process the collected video data in real time.

The present application provides an intelligent processing system for video data, which can intelligently process the collected video data in real time.

An intelligent processing method for video data, wherein in the case that an intelligent camera sets a warning rule, the method includes:

the intelligent camera collecting video data and analyzing the collected video data in real time, generating intelligent data if the warning rule is met, which intelligent data contain an encoder identifier and motion trajectory information;

the intelligent camera packaging the video data and the intelligent data into a program stream and sending it to a frame analyzing component in a cloud storage system;

the frame analyzing component unpacking the received program stream to obtain the video data and the intelligent data, and storing the video data and the intelligent data in storage components respectively;

the storage components sending storage address information of the video data and the intelligent data to an index server for recording respectively.

An intelligent processing system for video data includes an intelligent camera, a frame analyzing component, an index server and a plurality of storage components;

the intelligent camera sets a warning rule; the intelligent camera is used for collecting video data and analyzes the collected video data in real time, generating intelligent data that contain an encoder identifier and motion trajectory information if the warning rule is met, packaging the video data and the intelligent data into a program stream and sending it to the frame analyzing component;

the frame analyzing component is used for unpacking the received program stream to obtain the video data and the intelligent data, and storing the video data and the intelligent data in the storage components respectively;

the storage components are used for sending storage address information of the video data and the intelligent data to the index server after the video data and the intelligent data are stored;

the index server is used for recording the received storage address information of the video data and the intelligent data respectively.

It can be seen from the above solution that in the case that an intelligent camera sets a warning rule, the present application specifically discloses that: the intelligent camera collects video data and analyzes the collected video data in real time, generates intelligent data which include an encoder identifier and motion trajectory information if the warning rule is met; the intelligent camera packages the video data and the intelligent data into a program stream and sends it to a frame analyzing component in a cloud storage system; the frame analyzing component unpacks the received program stream to obtain the video data and the intelligent data, and stores the video data and the intelligent data in storage components respectively; the storage components send storage address information of the video data and the intelligent data to an index server for recording respectively.

In the present application, the collected video data are analyzed in real time by an intelligent camera, and the video data together with the intelligent data obtained through analysis are sent to a cloud storage system for storage respectively in a cloud storage mode; thus the intelligent processing for the collected video data is realized. Moreover, the intelligent data processing work that is completed by an individual video analyzing server in the prior art is distributed to various intelligent cameras, thereby increasing processing speed and reducing implementation difficulties significantly.

BRIEF DESCRIPTION OF THE DRAWINGS

In order to describe the technical solutions of embodiments of the present application or of the prior art more clearly, a simple introduction of the drawings required in the description of the embodiments and of the prior art will be given. Obviously, the drawings described below are just for some embodiments of the present application and other drawings may be obtained by those of ordinary skills in the art based on these drawings without any creative effort.

DETAILED DESCRIPTION

In order to make the objects, technical solutions and advantages more clearly, the present application will be further described in detail below with reference to the appended drawings and embodiments.

In the present application, in the case that an intelligent camera set a warning rule, the intelligent camera analyzes the collected video data in real time and sends the video data together with the intelligent data obtained through analysis to a cloud storage system for storage respectively in a cloud storage mode; thereby realizing the intelligent processing for the collected video data.

Figure 1:
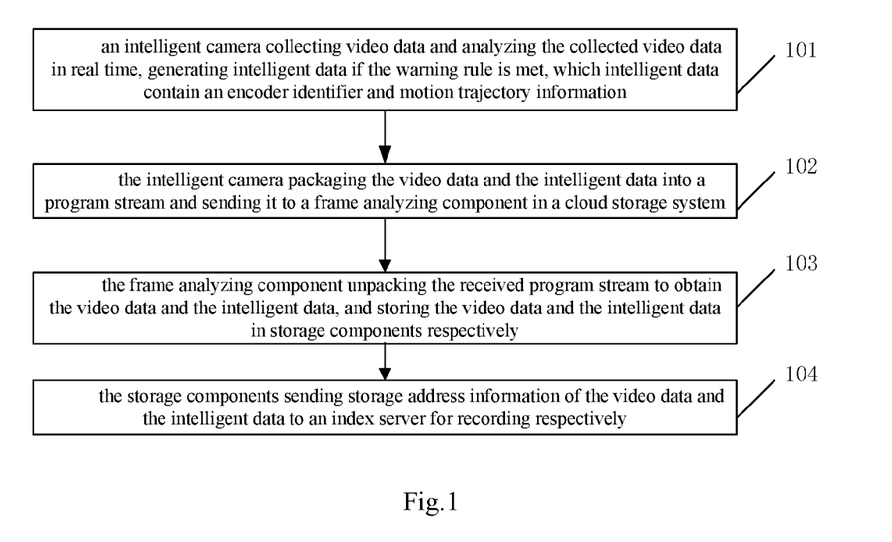
FIG. 1 is a schematic flowchart of an intelligent processing method for video data of the present application.

Refer to FIG. 1, which is a schematic flowchart of an intelligent processing method for video data of the present application. Currently, cameras that collect video data are all intelligent cameras, functional extensions may be performed on the intelligent cameras according to their characteristics. In the present application, the intelligent camera sets a warning rule and analyzes the collected video data in real time according to the warning rule to generate intelligent data.

The flowchart in FIG. 1 may include the following steps:

Step 101, an intelligent camera collecting video data and analyzing the collected video data in real time, generating intelligent data if the warning rule is met, which intelligent data contain an encoder identifier and motion trajectory information.

A warning rule includes at least one of target motion information and target feature information, the target motion information including location range information and motion variation information.

The target motion information includes the location range information and the motion variation information; the location range information is specifically, for example, a rounded area, a square area and the like which is determined within a video monitoring range, and the motion variation information is specifically, for example, a target crossing line, a target invading, a target forgetting an object and the like.

The warning rule may further include target feature information as needed, such as gender, age group, eye spacing, wearing glasses or not, etc. of a person; color and tiled angle of a license plate, color of a car body and the like.

The encoder identifier is an identifier of an intelligent camera, and the motion trajectory information is the motion trajectory information of a target which meets the warning rule, i.e. the motion trajectory information within the location range. For example, if the location range information in the target motion information is a square area that is denoted as A and the motion variation information is that a moving target enters into A from outside, then the motion trajectory information in the generated intelligent data is motion coordinate information within the location range A. Contents contained in the warning rule may be set as needed. For example, if the warning rule further contains target feature information, then the generated intelligent data further contain a target feature parameter. As an example, if the target feature information is the gender of a person and the generated intelligent data further contain the target feature parameter, then the target feature parameter 0 represents that the target invading an area is a woman, and the parameter 1 represents that the target invading an area is a man.

Analyzing video data and identifying motion information and feature information in video images belong to the prior art. For example, the motion trajectory of a target and the feature information of a moving target may be identified, the feature information including gender, age group, eye spacing, wearing glasses or not, etc. of a person; color and tiled angle of a license plate, color of a car body and the like.

Step 102, the intelligent camera packaging the video data and the intelligent data into a program stream and sending it to a frame analyzing component in a cloud storage system.

The program stream (PS) is obtained by packaging the video data collected in real time together with the intelligent data generated in real time.

Step 103, the frame analyzing component unpacking the received program stream to obtain the video data and the intelligent data, and storing the video data and the intelligent data in storage components respectively.

The video data and the intelligent data are obtained and stored respectively.

Specifically, the video data and the intelligent data are stored in respective storage components in a cloud storage system separately in the form of data blocks. Usage states of respective data blocks in all the storage components are stored in an index server. When data need to be written in, the frame analyzing component firstly requests the index server for free data blocks, the index server selects storage components according to certain distributed storage strategies, chooses suitable free data blocks in the corresponding storage components and then feeds address information of the chosen data blocks back to the frame analyzing component. The frame analyzing component writes the video data and the intelligent data into the corresponding data blocks respectively according to the address information of the data blocks.

Figure 2:
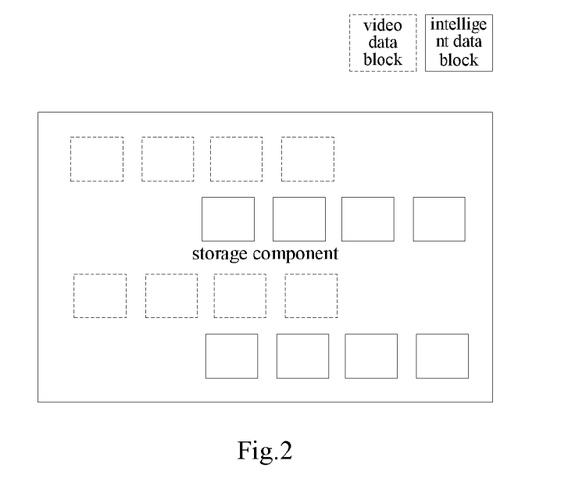
FIG. 2 is an example of a schematic view of video data and intelligent data stored in storage components of the present application.

Refer to FIG. 2, which is an example of a schematic view of the video data and the intelligent data stored in the storage components. A video data block is denoted by a dash line block, and an intelligent data block is denoted by a solid line block.

Step 104, the storage components sending storage address information of the video data and the intelligent data to an index server for recording respectively.

In the index server, the storage address information related to the video data and that related to the intelligent data are stored respectively.

The storage address information related to the video data includes address information, an encoder identifier (ID), a time point and the like. The encoder identifier (ID) is used to represent the corresponding intelligent camera and the time point is used to represent the corresponding time of the video data.

The storage address information related to the intelligent data also includes address information, an encoder identifier (ID), a time point and the like. The address information includes information on storage components and information on data blocks. The time point represents the time for storing the intelligent data. Specifically, when storing the intelligent data, the storage components further stamps the stored intelligent data with a local timestamp of storage.

Figure 3:
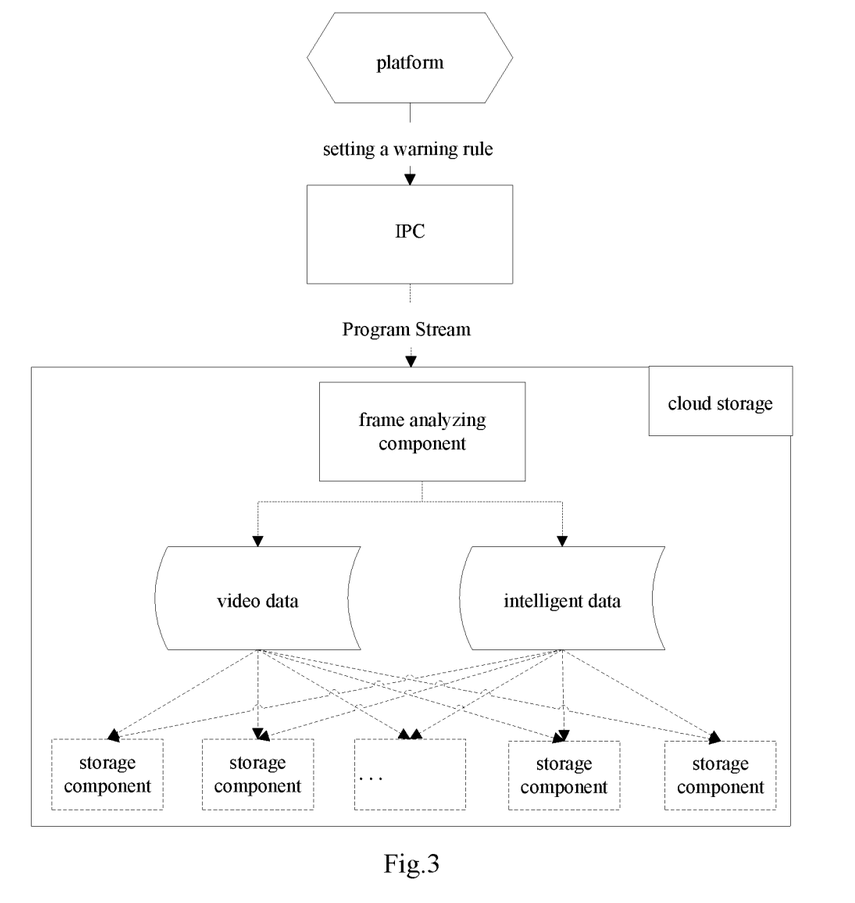
FIG. 3 is an example of a schematic view of an intelligent storage method for video data of the present application.

As shown in FIG. 3, which is an example of a schematic view of an intelligent storage method for video data of the present application, an example of a schematic view of storing video data and intelligent data is provided. In this example, a user visits a webpage of an intelligent IPC and sets a warning rule for the intelligent IPC through an intelligent IPC platform, and the intelligent IPC stores the warning rule. After that, the intelligent IPC combines the warning rules and stores data.

In the present application, an intelligent camera set a warning rule, specifically: an intelligent camera collects video data and analyzes the collected video data in real time, generates intelligent data which include an encoder identifier and motion trajectory information if the warning rule is met; the intelligent camera packages the video and the intelligent data into a program stream and sends it to a frame analyzing component in a cloud storage system; the frame analyzing component unpacks the received program stream to obtain the video data and the intelligent data, and stores the video data and the intelligent data in the storage components respectively; the storage components send the storage address information of the video data and of the intelligent data to an index server for recording respectively. In the present application, the intelligent camera analyzes the collected video data in real time and sends the video data together with the intelligent data obtained through analysis to a cloud storage system for storage respectively in a cloud storage mode; the intelligent processing for the collected video data is thereby realized. Moreover, the intelligent data processing work that is completed by an individual video analyzing server in the prior art is distributed to various intelligent cameras, thereby increasing processing speed and reducing implementation difficulties significantly.

Figure 4:
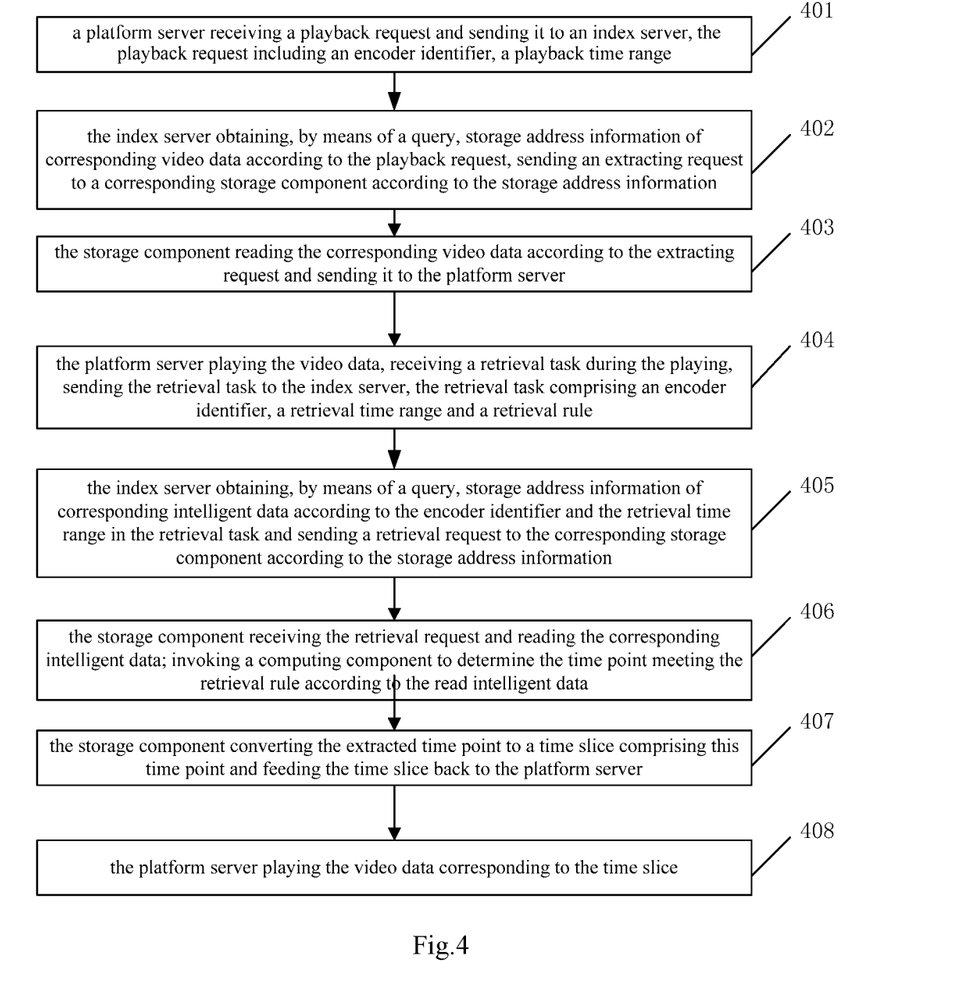
FIG. 4 is an example of a schematic flowchart of an intelligent playback method for video data of the present application.

After the video data and the intelligent data are stored, the video data may be played back as needed; and during the playback, the video data meeting conditions and requirements may be rapidly extracted and played based on the intelligent data. An example is illustrated below in combination with the flowchart of FIG. 4, which is an example of a flowchart of an intelligent playback method for video data of the present application, and the method may include the following steps:

Step 401, a platform server receiving a playback request and sending it to the index server, the playback request including an encoder identifier, a playback time range.

The platform server provides services such as indexing, playback and the like of the video data, and users visit the platform server if needed and input a playback request.

Step 402, the index server obtaining, by means of a query, storage address information of corresponding video data according to the playback request, and sending an extracting request to a corresponding storage component according to the storage address information.

The storage address information meeting conditions may be obtained, by means of a query, according to the encoder identifier, the playback time range contained in the playback request.

Step 403, the storage component reading the corresponding video data according to the extracting request, and sending it to the platform server.

The extracting request includes address information, and the storage component reads the corresponding video data according to the address information after receiving the extracting request.

Step 404, the platform server playing the video data, receiving a retrieval task during the playing, sending the retrieval task to the index server, the retrieval task including an encoder identifier, a retrieval time range and a retrieval rule, wherein the retrieval rule includes target motion information that includes location range information and motion variation information.

During the playing, a user may input a retrieval task as needed, and there are a plurality of inputting ways, such as entering an interface for setting rules and inputting various contents of the retrieval task according to prompts. It is also possible to input the retrieval task in combination with drawings on screen and interface setting. Specifically, it is possible to draw the location range information by touching the screen with fingers, drawing on the screen with a stylus or a mouse. Two implementing manners are illustrated below:

Manner 1:

during the playing, receiving the location range information drawn on a paused image by a user; and receiving the motion variation information input on an interface for setting rules.

Manner 2: during the playing, receiving the location range information drawn on a paused image by a user; and receiving the motion variation information and the target feature information input on an interface for setting rules; the motion variation information includes information on a target crossing line, information on a target invading or information on a target forgetting an object and the like.

Step 405, the index server obtaining, by means of a query, storage address information of corresponding intelligent data according to the encoder identifier and the retrieval time range in the retrieval task and sending a retrieval request to the corresponding storage component according to the storage address information.

Step 406, the storage component receiving the retrieval request and reading the corresponding intelligent data; invoking a computing component to determine the time point meeting the retrieval rule according to the read intelligent data.

The retrieval request includes address information, and it is possible to read the corresponding intelligent data according to the address information. The corresponding time point is contained in the intelligent data, and if the intelligent data meeting the retrieval rule are determined, the time point meeting the retrieval rule can be determined as well.

The time point meeting the requirements may be obtained directly according to the local timestamp of the intelligent data and in this case, the time point is also the local timestamp. It can also be obtained according to the relative time in the intelligent data and the local timestamp. Specifically:

the generated intelligent data further include the relative time, and the obtaining of the relative time includes: denoting the time of generating intelligent data as T1, denoting the time of collecting corresponding video data as T2, taking the difference between T1 and T2 as the relative time. Generally, for a fixed intelligent camera, the relative time is a fixed value. When storing the intelligent data, the storage component further stamps the stored intelligent data with a local timestamp of storage. Determining the time point meeting the retrieval rule according to the read intelligent data includes:

determining the intelligent data meeting the retrieval rule from the read intelligent data; extracting the relative time and the local timestamp from the determined intelligent data and adding the relative time to the local timestamp to obtain an absolute time point which is the determined time point meeting the retrieval rule.

The determination of the time point meeting the retrieval rule according to the read intelligent data may be specifically accomplished by an intelligent computing component in the storage component.

Figure 5:
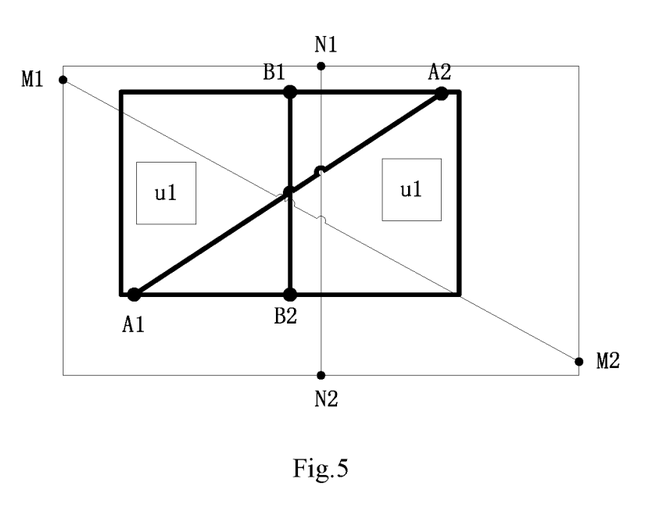
FIG. 5 is an example of a schematic view of retrieval for a target crossing line during the intelligent playback of the present application.
Figure 6:
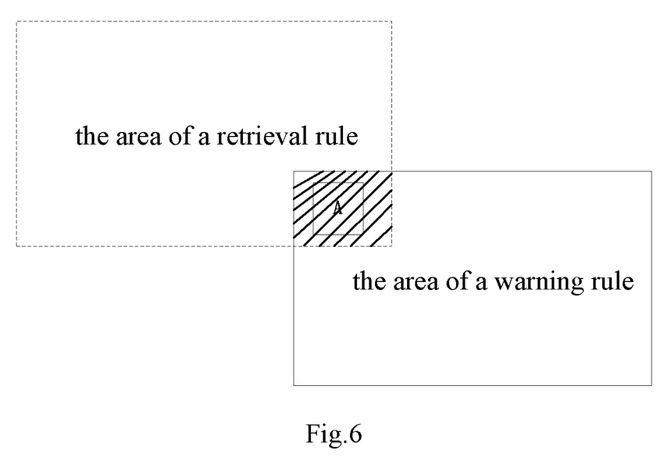
FIG. 6 is an example of a schematic view of retrieval for a target invading an area during the intelligent playback of the present application.
Figure 7:
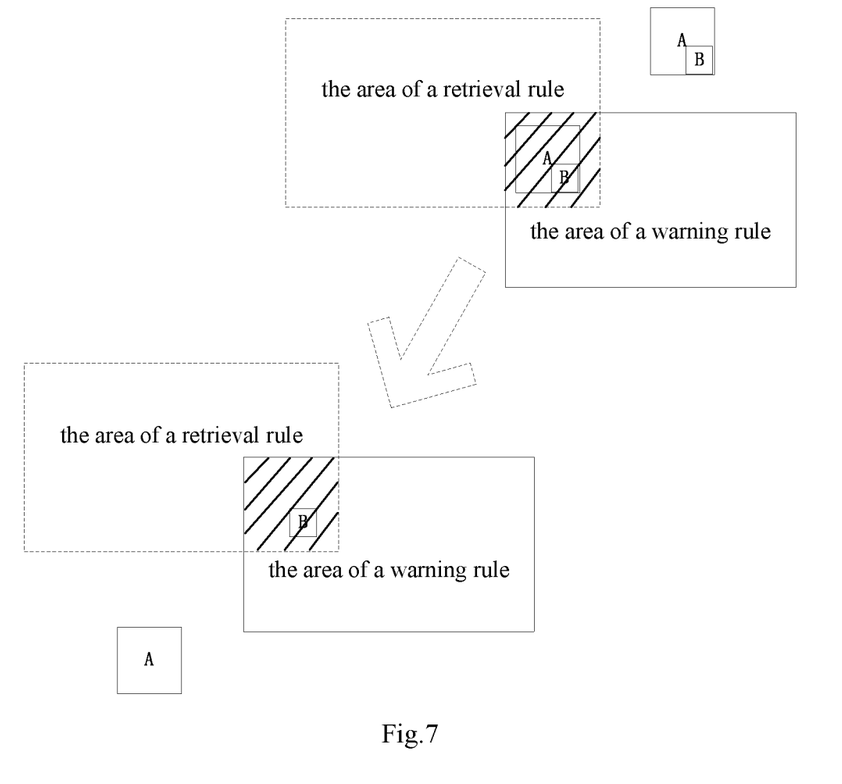
FIG. 7 is an example of a schematic view of retrieval for a target forgetting an object during the intelligent playback of the present application.

The retrieval rules are shown in the examples of FIGS. 5-7 which are illustrated below respectively:

Example 1, a Target Crossing Line

In FIG. 5, the bold line part indicates the drawing made by a user on a playback image, and the retrieval rule is: a moving target moves from the left of A1A2 to the right and passes across B1B2. The thin line part indicates a warning rule: a moving target moves from the left of M1M2 to the right and passes across N1N2. An intelligent computing component performs geometric calculation in combination with the motion trajectory information contained in the intelligent data and determines whether a target (the motion coordinates of which may be obtained by means of the motion trajectory information) meeting the warning rule also meets the retrieval rule. If so, the time point is extracted in corresponding intelligent data and step 407 is executed; if not, the time point is not extracted. When a user draws on a playback image, only the drawing lines related to the retrieval rule are displayed. The drawing lines of the retrieval rule and the warning rule are displayed simultaneously in FIG. 5 for better understanding and visualizing. Examples of a target U1 crossing line are shown in this figure.

Example 2, a Target Invading an Area

In FIG. 6, the dash line part indicates the drawing on a playback image made by a user, and the retrieval rule is: a moving target moves into the dash line box from the outside of the dash line box. The solid line part indicates the warning rule: a moving target moves into the solid line box from the outside of the solid line box. An intelligent computing component performs geometric calculation and determines whether the target meeting the warning rule also meets the retrieval rule. If so, the time point is extracted in corresponding intelligent data and step 407 is executed; if not, the time point is not extracted. As the example shown in FIG. 6, the target whose motion trajectory is in the shaded area meets the retrieval rule simultaneously.

Example 3, a Target Forgetting an Object

In FIG. 7, the dash line part indicates the drawing on a playback image made by a user, and the retrieval rule is: a moving target moves into the dashed line box from outside and forgets an object. The solid line part in this figure indicates the warning rule: a moving target moves into the solid line box from outside and forgets an object. An intelligent computing component performs geometric calculation and determines whether the target meeting the warning rule also meets the retrieval rule. If so, the time point is extracted in corresponding intelligent data and step 407 is executed; if not, the time point is not extracted. As the example shown in FIG. 7, the target whose motion trajectory is in the shaded area meets the retrieval rule simultaneously; a moving target A carrying an object B enters the area and forgets the object B. The moving target forgetting an object may be determined by existing image recognition technologies. For example, the image features are recognized, and if the image feature varies significantly after a target moves away from the location range, and the varied image features are matched within the location range, then there is a forgotten object.

step 407, the storage component converting the extracted time point to a time slice including this time point and feeding the time slice back to the platform server.

The time point is advanced and delayed by a time period (the time before and after a warning event) according to the set rules to convert it to a time slice. For example, the time point is advanced and delayed by 5 seconds respectively.

local_time: local timestamp of an intelligent data;
relative_time: relative time;
absolute_time: absolute time point;
pre_time: the advanced time of an intelligent warning, the time period advanced before the moment when the warning occurs;
delay_time: the delayed time of an intelligent warning, the time period delayed after the moment when the warning occurs;
the absolute time point when the warning occurs: absolute_time=local_time+relative_time
the absolute time slice when the warning occurs:
[absolute_time−pre_time, absolute_time+delay_time].

Further, it is also possible to combine the time slices beforehand when the time slices are fed back to the platform. Specifically, if there is an overlap between adjacent time slices, the corresponding time slices are combined.

Step 408, the platform server playing the video data corresponding to the time slice.

Specifically, it is possible to only play the video data corresponding to the retrieved time slice and it is also possible to perform concentrated play (fast and slow play) according to the retrieval results.

In the present application, due to the distribution of the intelligent data storage and of the deployment of the intelligent computing components (the intelligent computing components are deployed together with the storage components), the intelligent data may be extracted from a plurality of storage components in parallel at a high speed and the efficiency of intelligent computing is further increased due to parallel computing; a stand-alone server is not comparable to the cloud storage in terms of the performance and efficiency due to the limitation of the disk IO and the hardware resources of a single device.

In the present application, the intelligent computing component is directly embedded in the storage components of cloud storage, which saves the disk cost of a video analyzing server and relieves the pressure on network bandwidth. Moreover, intelligent retrieval and intelligent playback in real time are supported, and thus the defects in the prior art can be well overcome. In addition, the cluster characteristics of cloud storage and the advantages of distributed data storage make it possible to minimize the disturbance on the writing of normal video caused by writing intelligent data, and to better solve the single-point fault issue during intelligent retrieval. More importantly, no other stand-alone server (in the prior art, the extracting of intelligent data and intelligent computing are assisted by an individual video analyzing server) is comparable in terms of extracting the intelligent data and the efficiency of intelligent computing.

Further, in the present application, the intelligent camera performs statistics on traffic information periodically to obtain traffic parameters; the intelligent camera further packages the traffic parameters into the program stream when packaging the video data and the intelligent data in the step of 102 in FIG. 1, and sends it to the frame analyzing component in a cloud storage system.

In step 103, when unpacking the received program stream, the frame analyzing component also obtains the traffic parameters in addition to the video data and the intelligent data and stores the traffic parameters in the storage components.

The storage components further send storage address information of the traffic parameters to the index server for recording.

The traffic information is for example the driveway speed, the number of compact vehicles, the number of middle-sized vehicles, the number of heavy duty vehicles, the driveway state, the traffic jam length and the like. The traffic information can be obtained by identifying and analyzing the collected video images. The intelligent camera identifies and analyzes the collected video images periodically to obtain the traffic parameters of each time point corresponding to the traffic. The storage address information recorded by the index server includes an encoder identifier, address information, and a time point; the intelligent cameras corresponding to different encoder identifiers are associated with different driveways.

After that, it is possible to retrieve the traffic parameters stored in the storage components as needed and to browse corresponding video data. Specifically:

the platform server receives a traffic parameter request and sends it to the index server, the traffic parameter request including an encoder identifier, a time range and a traffic retrieval rule;

the index server obtains, by means of a query, storage address information of a corresponding traffic parameter according to the encoder identifier and the time range in the traffic parameter request and sends the traffic parameter request to a corresponding storage component according to the storage address information;

the storage component receives the traffic parameter request and reads the corresponding traffic parameter; invokes a computing component to determine the time point meeting the traffic retrieval rule according to the read traffic parameter;

the storage component converts the extracted time point to a time slice including this time point and feeds the time slice back to the platform server;

the platform server plays the video data corresponding to the time slice.

During the retrieval, the platform server invokes the retrieval interface for traffic parameters of cloud storage and inputs the driveway of a traffic crossroad (encoder ID), a starting time, an ending time and a retrieval rule (for example, 1000 compact vehicles, 300 middle-sized vehicles, 50 heavy duty vehicles, the driveway state is "jammed", the jam length is 15 meters and the like). The search rules are the specific values of corresponding traffic items.

The cloud storage returns the retrieved time slice to the platform server, the platform server performs playback according to retrieval results, and corresponding real traffic parameters may be displayed on the images in an overlapped manner.

In the solution of intelligent processing for traffic parameters of the present application, statistics are performed for the traffic information periodically, and the traffic information is compressed by a front end into a code stream and stored in the storage components of a cloud storage system in a distributed manner. Thus, the disk cost of the video analyzing server and the storage server is saved, and pressure on the network bandwidth is relieved. In addition, the cluster characteristics of the cloud storage and the characteristics of distributed data storage well solves the single-point fault issue of retrieval services. Most importantly, no other stand-alone server is comparable in terms of search efficiency of traffic parameters. In this way, the planners of municipal transportation do not need to read numerical statistical information continuously or to always look at the video images; they can obtain the video images meeting the retrieval conditions displayed immediately as long as they examine the traffic crossroads of their interest and input query conditions of their interest. It has a significant referential meaning to the widening of roadways of the traffic crossroads, the adjustment of durations of the traffic lights, time period based traffic control for various types of vehicles and the like.

Figure 8:
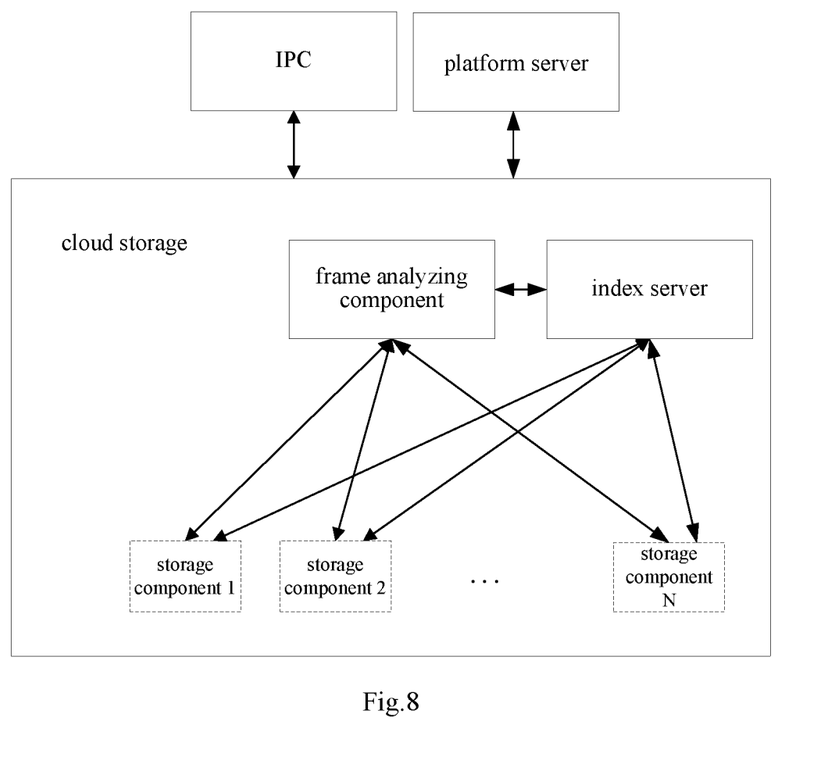
FIG. 8 is an example of a schematic structure view of an intelligent processing system for video data of the present application.

Refer to FIG. 8, which is an example of the schematic structure view of an intelligent processing system for video data of the present application. The system may include an intelligent camera (intelligent IPC), a frame analyzing component, an index server, and N storage components, wherein the N storage components are respectively: the storage component 1, the storage component 2, . . . , the storage component N, wherein the frame analyzing component, the index server and the N storage components are located within a cloud storage system (briefly called "cloud storage");

the intelligent camera set a warning rule; the intelligent camera is used for collecting video data and analyzes the collected video data in real time, generating intelligent data that contain an encoder identifier and motion trajectory information if the warning rule is met, packaging the video data and the intelligent data into a program stream and sending it to the frame analyzing component;

the frame analyzing component is used for unpacking the received program stream to obtain the video data and the intelligent data, and storing the video data and the intelligent data in the storage components respectively;

the storage components are used for sending storage address information of the video data and the intelligent data to the index server after the video data and the intelligent data are stored;

the index server is used for recording the received storage address information of the video data and the intelligent data respectively.

Preferably, the system may further include a platform server which is used for receiving a playback request and sending it to the index server, the playback request including an encoder identifier, a playback time range; the platform server is further used for receiving video data fed back by a corresponding storage component, playing the video data, receiving a retrieval task during the playing, sending the retrieval task to the index server, the retrieval task including an encoder identifier, a retrieval time range and a retrieval rule; the platform server is further used for receiving a time slice fed back by a corresponding storage component and playing the video data corresponding to the time slice.

The index server is used for obtaining, by means of a query, storage address information of corresponding video data according to the received playback request, and sending an extracting request to a corresponding storage component according to the storage address information; it is further used for receiving the retrieval task from the platform server, obtaining, by means of a query, storage address information of corresponding intelligent data according to the encoder identifier and the retrieval time range in the retrieval task, and sending the retrieval task to a corresponding storage component according to the storage address information the storage component is used for receiving the playback request from the index server, reading corresponding video data according to the playback request, and sends it to the platform server; it is further used for receiving the retrieval task from the index server, reading the intelligent data corresponding to the encoder identifier and the retrieval time range in the retrieval task; determining a time point meeting the retrieval rule according to the read intelligent data; converting the extracted time point to a time slice including this time point and feeding the time slice back to the platform server.

Preferably, the platform server is used for, during the playing, receiving location range information drawn on a paused image by a user; and receiving a motion variation rule input on an interface for setting rules.

Preferably, the intelligent camera is further used for obtaining relative time and incorporating the relative time into the intelligent data, the relative time being the difference between the time of generating the intelligent data and the time of collecting the corresponding video data;

the storage components are further used for, when storing the intelligent data, stamping the stored intelligent data with a local timestamp of storage; during the determination of a time point meeting the retrieval rule according to the read intelligent data, determining the intelligent data meeting the retrieval rule from the read intelligent data; extracting the relative time and the local timestamp from the determined intelligent data, and obtaining an absolute time point by adding the relative time to the local timestamp, the absolute time point being the determined time point meeting the retrieval rule.

Preferably, the intelligent camera is further used for performing statistics on traffic information periodically to obtain traffic parameters, and packaging the traffic parameters into the program stream;

the frame analyzing component is further used for, when unpacking the received program stream, obtaining the traffic parameters and storing the traffic parameters in the storage components;

the storage components are further used for sending storage address information of the traffic parameters to the index server;

the index server is used for recording the received storage address information related to the traffic parameters.

Preferably, the storage address information recorded by the index server includes an encoder identifier, address information and a time point;

the system further includes a platform server which is used for receiving a traffic parameter request and sending it to the index server, the traffic parameter request including an encoder identifier, a time range and traffic retrieval rules. The platform server is further used for receiving a time slice fed back by a storage component and playing the video data corresponding to the time slice;

the index server is used for obtaining, by means of a query, storage address information of a corresponding traffic parameter according to the encoder identifier and the time range in the traffic parameter request and sending the traffic parameter request to a corresponding storage component according to the storage address information;

the storage component is used for receiving the traffic parameter request, reading the corresponding traffic parameter, invoking a computing component to determine a time point meeting the traffic retrieval rule according to the read traffic parameter; converting the extracted time point to a time slice including this time point and feeding the time slice back to the platform server.

The above descriptions are only specific implementations of the present application, to which the protection scope of the present application is not limited. The variations and alternatives that any skilled in the art can easily conceived should fall into the protection scope of the present application. Therefore, the protection scope of the present application should be determined by that of the appended claims.

What is claimed is:

1. An intelligent processing method for video data, wherein in the case that an intelligent camera sets a warning rule, the method comprises:

the intelligent camera collecting video data and analyzing the collected video data in real time, generating intelligent data if the warning rule is met, wherein intelligent data contains an encoder identifier and motion trajectory information;

the intelligent camera packaging the video data and the intelligent data into a program stream and sending it to a frame analyzing component in a cloud storage system;

the frame analyzing component unpacking the received program stream to obtain the video data and the intelligent data, and storing the video data and the intelligent data in storage components respectively;

the storage components sending storage address information of the video data and the intelligent data to an index server for recording respectively;

wherein the video data and the intelligent data are stored in respective storage components in a cloud storage system separately in the form of data blocks, usage states of respective data blocks in all the storage components are stored in the index server; when data need to be written in, the storage components firstly request the index server for free data blocks, the index server selects storage components according to distributed storage strategies, chooses suitable free data blocks in the corresponding storage components and then feeds address information of the chosen data blocks back to the frame analyzing component; the frame analyzing component writes the video data and the intelligent data into the corresponding data blocks respectively according to the address information of the data blocks;

wherein, the storage address information recorded by the index server comprises an encoder identifier, address information, and a time point, the method further comprising:

a platform server receiving a playback request and sending it to the index server, the playback request comprising an encoder identifier, a playback time range;

the index server obtaining, by means of a query, storage address information of corresponding video data according to the playback request, sending an extracting request to a corresponding storage component according to the storage address information;

the storage component reading the corresponding video data according to the extracting request and sending it to the platform server;

the platform server playing the video data, receiving a retrieval task during the playing, sending the retrieval task to the index server, the retrieval task comprising an encoder identifier, a retrieval time range and a retrieval rule;

the index server obtaining, by means of a query, storage address information of corresponding intelligent data according to the encoder identifier and the retrieval time range in the retrieval task and sending a retrieval request to the corresponding storage component according to the storage address information;

the storage component receiving the retrieval request and reading the corresponding intelligent data; invoking a computing component to determine the time point meeting the retrieval rule according to the read intelligent data;

the storage component converting the extracted time point to a time slice comprising this time point and feeding the time slice back to the platform server;

the platform server playing the video data corresponding to the time slice.

2. The method as claimed in claim 1, wherein, the warning rule comprises at least one of target motion information and target feature information, the target motion information comprising location range information and motion variation information.

3. The method as claimed in claim 1, wherein, the retrieval rule comprises target motion information that comprises location range information and motion variation information; the platform server receiving a retrieval task during the playing comprises: during the playing, the platform server receiving location range information drawn on a paused image by a user; and receiving a motion variation rule input on an interface for setting rules.

4. The method as claimed in claim 1, wherein, the retrieval task further comprises the target feature information;

the platform server receiving a retrieval task during the playing comprises, during the playing, receiving the target feature information input by a user on an interface for setting rules.

5. The method as claimed in claim 1, wherein, the generated intelligent data further comprises relative time that is the difference between the time of generating the intelligent data and the time of collecting the corresponding video data; when storing the intelligent data, the storage component further stamps the stored intelligent data with a local timestamp of storage;

determining the time point meeting the retrieval rule according to the read intelligent data comprises:

determining the intelligent data meeting the retrieval rule from the read intelligent data; extracting the relative time and the local timestamp from the determined intelligent data and adding the relative time to the local timestamp to obtain an absolute time point which is the determined time point meeting the retrieval rule.

6. The method as claimed in claim 1, wherein, the method further comprises:

the intelligent camera performing statistics on traffic information periodically to obtain traffic parameters; the intelligent camera further packaging the traffic parameters into the program stream;

when unpacking the received program stream, the frame analyzing component also obtaining the traffic parameters and storing the traffic parameters in the storage components;

the storage components further sending storage address information of the traffic parameters to the index server for recording.

7. The method as claimed in claim 6, wherein the storage address information recorded by the index server comprises an encoder identifier, address information, and a time point, the method further comprising:

the platform server receiving a traffic parameter request and sending it to the index server, the traffic parameter request comprising an encoder identifier, a time range and a traffic retrieval rule;

the index server obtaining, by means of a query, storage address information of a corresponding traffic parameter according to the encoder identifier and the time range in the traffic parameter request and sending the traffic parameter request to a corresponding storage component according to the storage address information;

the storage component receiving the traffic parameter request and reading the corresponding traffic parameter; invoking a computing component to determine a time point meeting the traffic retrieval rule according to the read traffic parameter;

the storage component converting the extracted time point to a time slice comprising this time point and feeding the time slice back to the platform server;

the platform server playing the video data corresponding to the time slice.

8. An intelligent processing system for video data, wherein the system comprises an intelligent camera, a frame analyzing component, an index server and a plurality of storage components;

the intelligent camera sets a warning rule; the intelligent camera is used for collecting video data and analyzes the collected video data in real time, generating intelligent data that contain an encoder identifier and motion trajectory information if the warning rule is met, packaging the video data and the intelligent data into a program stream and sending it to the frame analyzing component;

the frame analyzing component is used for unpacking the received program stream to obtain the video data and the intelligent data, and storing the video data and the intelligent data in the storage components respectively;

the storage components are used for sending storage address information of the video data and the intelligent data to the index server after the video data and the intelligent data are stored;

the index server is used for recording the received storage address information of the video data and the intelligent data respectively;

wherein the video data and the intelligent data are stored in respective storage components in a cloud storage system separately in the form of data blocks, usage states of respective data blocks in all the storage components are stored in the index server; when data need to be written in, the storage components firstly request the index server for free data blocks, the index server selects storage components according to distributed storage strategies, chooses suitable free data blocks in the corresponding storage components and then feeds address information of the chosen data blocks back to the frame analyzing component; the frame analyzing component writes the video data and the intelligent data into the corresponding data blocks respectively according to the address information of the data blocks;

wherein the storage address information recorded by the index server comprises an encoder identifier, address information, and a time point;

the system further comprises a platform server which is used for receiving a playback request and sending it to the index server, the playback request comprising an encoder identifier, a playback time range; the platform server is further used for receiving video data fed back by a corresponding storage component, playing the video data, receiving a retrieval task during the playing, sending the retrieval task to the index server, the retrieval task comprising an encoder identifier, a retrieval time range and a retrieval rule; the platform server is further used for receiving a time slice fed back by a corresponding storage component and playing the video data corresponding to the time slice;

the index server is used for obtaining, by means of a query, storage address information of corresponding video data according to the received playback request, and sending an extracting request to a corresponding storage component according to the storage address information; it is further used for receiving the retrieval task from the platform server, obtaining, by means of a query, storage address information of corresponding intelligent data according to the encoder identifier and the retrieval time range in the retrieval task, and sending the retrieval task to a corresponding storage component according to the storage address information;

the storage component is used for receiving the playback request from the index server, reading corresponding video data according to the playback request, and sends it to the platform server; it is further used for receiving the retrieval task from the index server, reading the intelligent data corresponding to the encoder identifier and the retrieval time range in the retrieval task; determining a time point meeting the retrieval rule according to the read intelligent data; converting the extracted time point to a time slice comprising this time point and feeding the time slice back to the platform server.

9. The system as claimed in claim 8, wherein, the platform server is used for, during the playing, receiving location range information drawn on a paused image by a user; and receiving a motion variation rule input on an interface for setting rules.

10. The system as claimed in claim 8, wherein, the intelligent camera is further used for obtaining relative time and incorporating the relative time into the intelligent data, the relative time being the difference between the time of generating the intelligent data and the time of collecting the corresponding video data;

the storage components are further used for, when storing the intelligent data, stamping the stored intelligent data with a local timestamp of storage; during the determination of a time point meeting the retrieval rule according to the read intelligent data, determining the intelligent data meeting the retrieval rule from the read intelligent data; extracting the relative time and the local timestamp from the determined intelligent data, and obtaining an absolute time point by adding the relative time to the local timestamp, the absolute time point being the determined time point meeting the retrieval rule.

11. The system as claimed in claim 8, wherein, the intelligent camera is further used for performing statistics on traffic information periodically to obtain traffic parameters, and packaging the traffic parameters into the program stream;

the frame analyzing component is further used for, when unpacking the received program stream, obtaining the traffic parameters and storing the traffic parameters in the storage components;

the storage components are further used for sending storage address information of the traffic parameters to the index server;

the index server is used for recording the received storage address information related to the traffic parameters.

12. The system as claimed in claim 11, wherein, the storage address information recorded by the index server comprises an encoder identifier, address information, and a time point, the system further comprises a platform server which is used for receiving a traffic parameter request and sending it to the index server, the traffic parameter request comprising an encoder identifier, a time range and a traffic retrieval rule; the platform server is further used for receiving a time slice fed back by a storage component and playing the video data corresponding to the time slice;

the index server is used for obtaining, by means of a query, storage address information of a corresponding traffic parameter according to the encoder identifier and the time range in the traffic parameter request and sending the traffic parameter request to a corresponding storage component according to the storage address information;

the storage component is used for receiving the traffic parameter request, reading the corresponding traffic parameter, invoking a computing component to determine a time point meeting the traffic retrieval rule according to the read traffic parameter; converting the extracted time point to a time slice comprising this time point and feeding the time slice back to the platform server.

* * * * *